United States Patent [19]

Creps

[11] Patent Number: 4,761,226
[45] Date of Patent: Aug. 2, 1988

[54] CONTINUOUSLY OPERABLE POWER ACTUATED VACUUM FILTER

[75] Inventor: John L. Creps, Rudolph, Ohio

[73] Assignee: Henry Filters, Inc., Bowling Green, Ohio

[21] Appl. No.: 913,385

[22] Filed: Sep. 30, 1986

[51] Int. Cl.⁴ .................... B01D 29/02; B01D 29/36; B01D 29/42

[52] U.S. Cl. .................... 210/106; 210/111; 210/193; 210/387; 210/416.1

[58] Field of Search ............... 210/106, 107, 109, 111, 210/117, 387, 406, 416.1, 195.1, 193, 400, 401

[56] References Cited

U.S. PATENT DOCUMENTS 3,618,772 11/1971 Dietrick ........................... 210/387
3,690,466 9/1972 Lee et al. ......................... 210/387
4,396,505 8/1983 Willson et al. ................. 210/416.1
4,571,302 2/1986 Willson ............................ 210/106

Primary Examiner—Richard V. Fisher
Assistant Examiner—Linda S. Evans
Attorney, Agent, or Firm—Nixon & Vanderhye

[57] ABSTRACT

A vacuum filter having a filter tank provided with a lower vacuum chamber covered with a filter medium and connected to the intake of a pump. The filter medium, either a paper web or a fibrous filter aid, is removed when contaminated by a chain and flight conveyor after the vacuum is relieved. The vacuum is relieved by a single power actuated valve operable to supply clean liquid to the pump from a clean liquid tank and to supply a limited amount of liquid to the vacuum chamber.

4 Claims, 3 Drawing Sheets

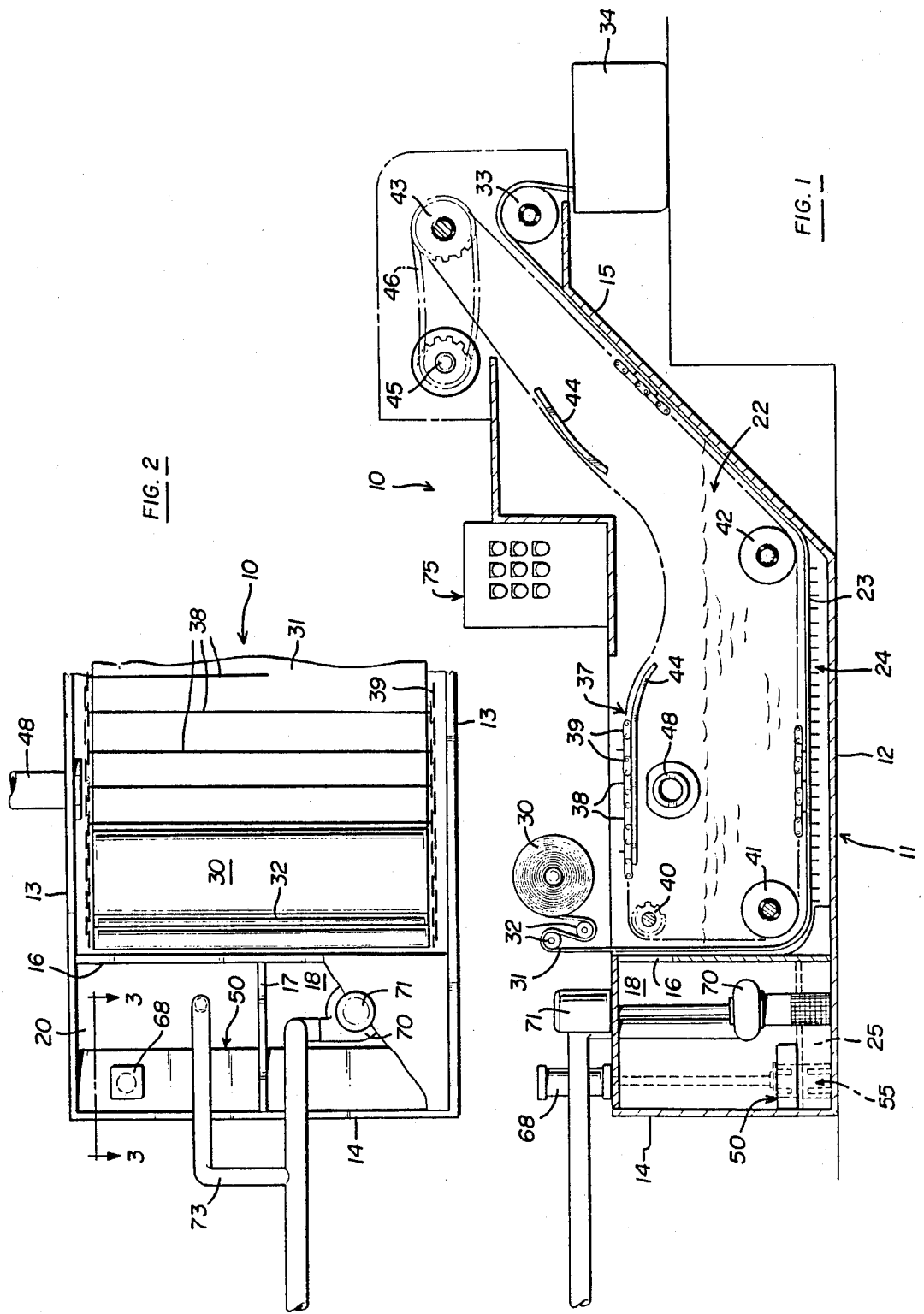

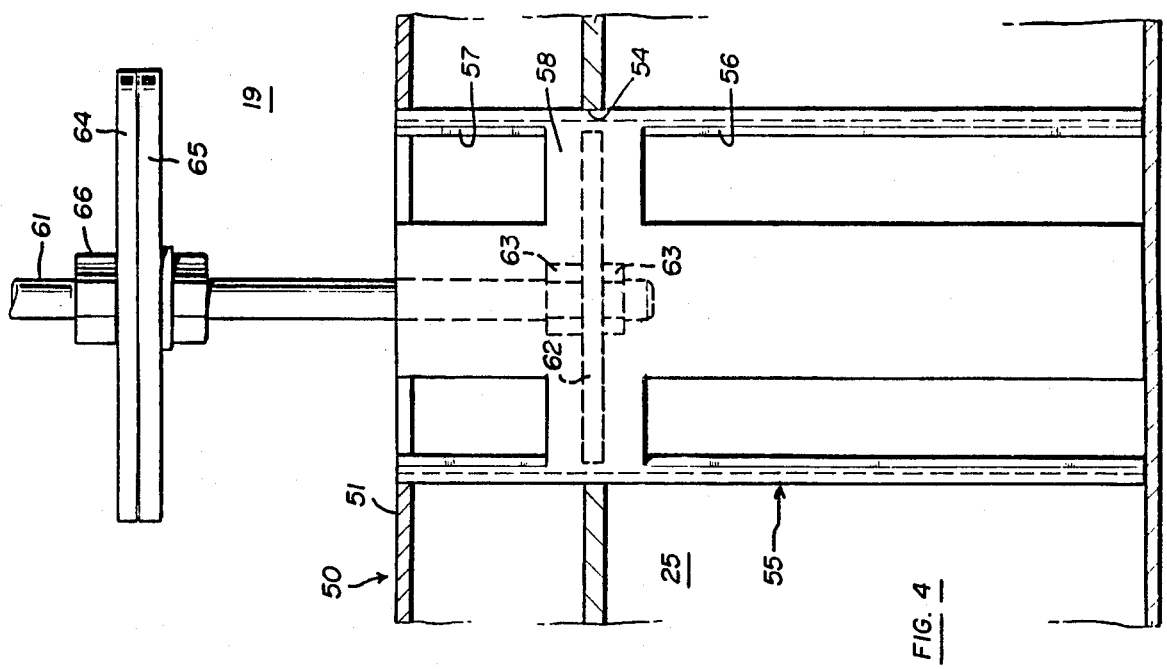
FIG. 4
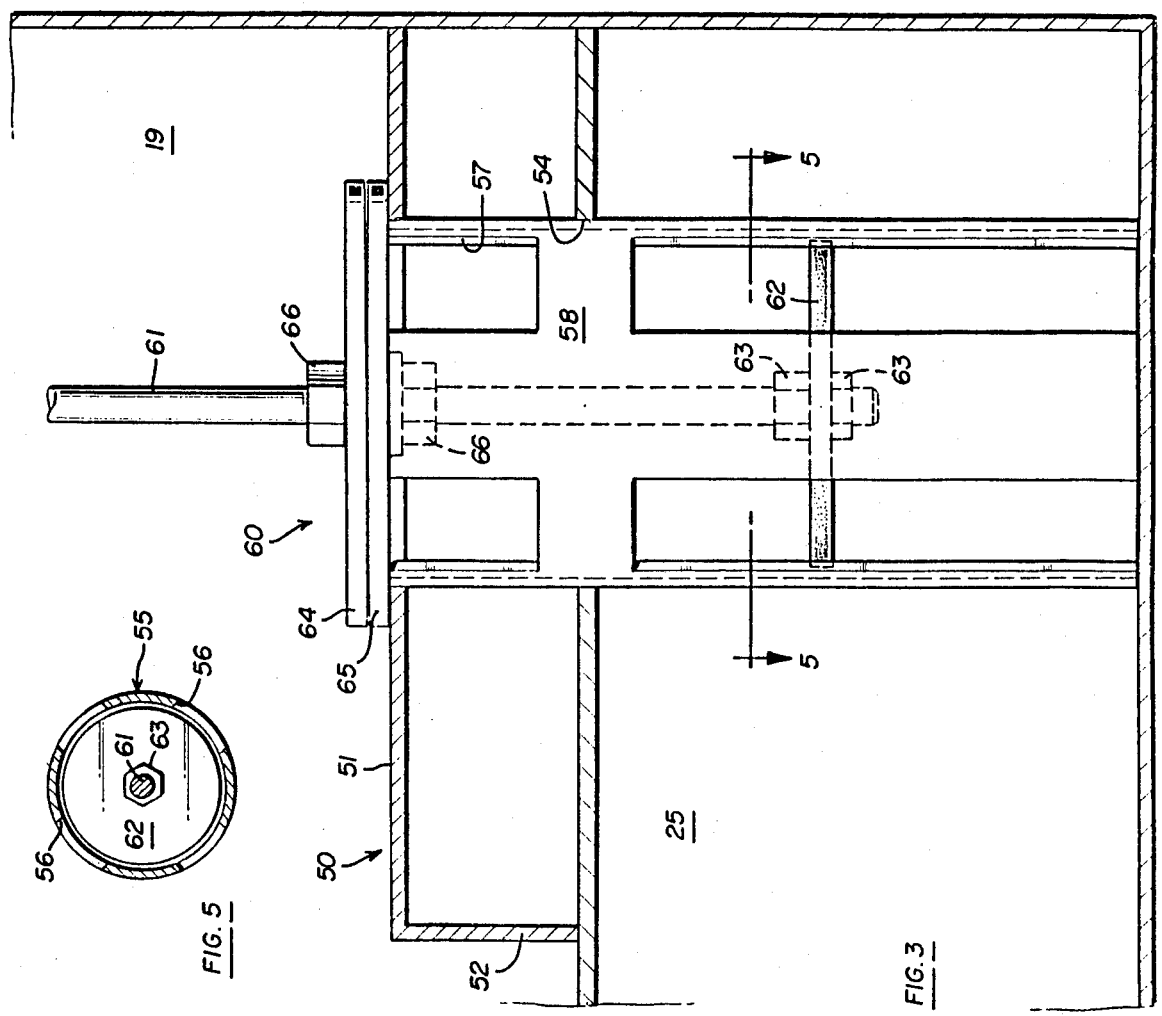
FIG. 5
FIG. 3

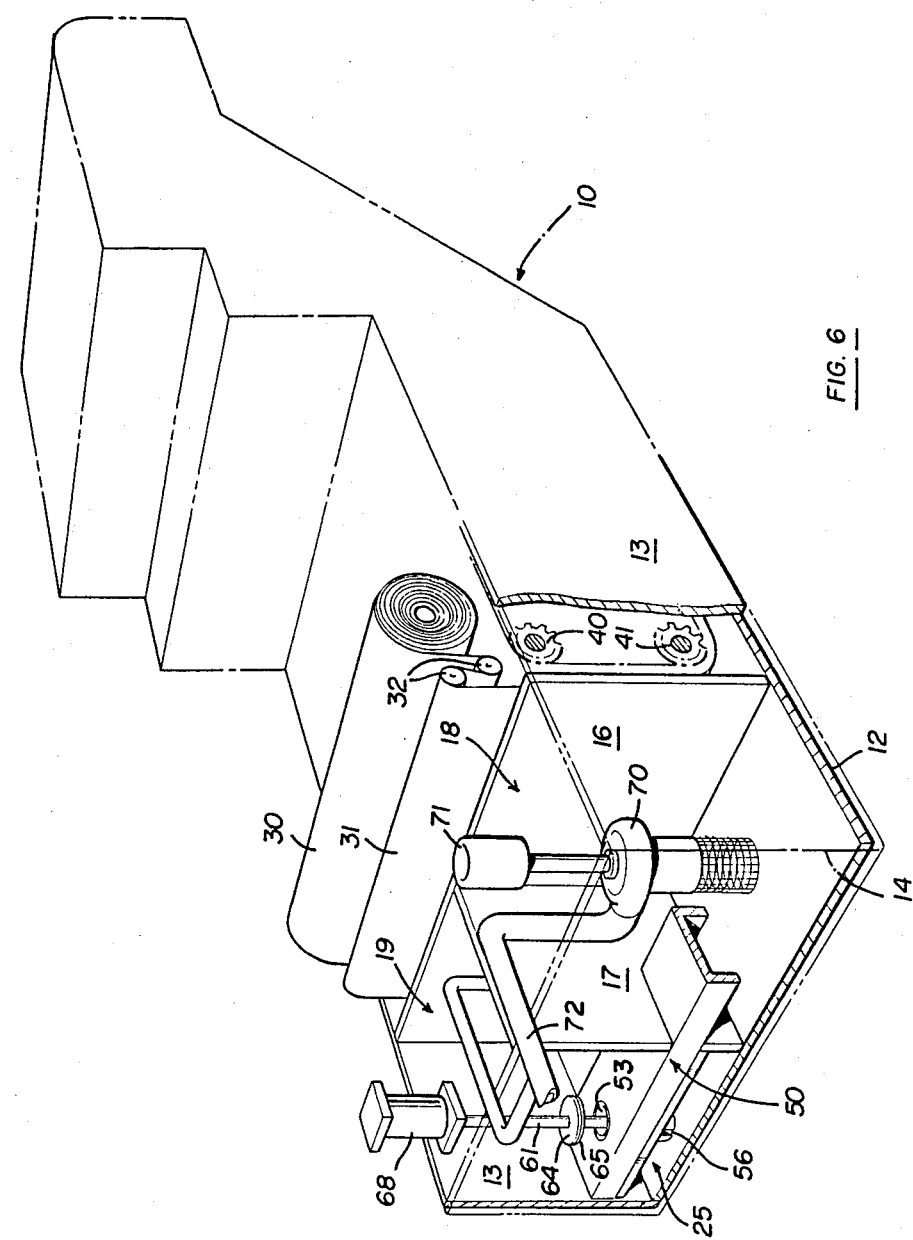

CONTINUOUSLY OPERABLE POWER ACTUATED VACUUM FILTER

BACKGROUND AND BRIEF DESCRIPTION OF THE INVENTION

The present invention relates to vacuum filters of the type wherein a filter tank is divided horizontally into an upper dirty liquid tank and a lower filtrate compartment beneath a filter medium, e.g., paper, which is interposed between the two compartments. To renew the filter paper, a chain and slat conveyor is utilized to move the paper and the contaminants accreted thereon out of the tank by travel up an inclined end wall of the tank. The conveyor is actuated to renew the filter medium in response to the differential pressure across the filter medium, indicating that the medium is clogged with contaminants. The filtrate compartment is connected to the intake of a filtrate pump to create the pressure differential across the paper medium, and the pump vacuum must be relieved in order to move the filter medium for renewal.

The prior art has suggested several different types of arrangements to relieve the pump vacuum when it is desired to do so. One of the earliest arrangements simply utilized a centrifugal pump, with the pump being shut off so that water in a filtrate storage tank or even in the pressure supply line from the pump could run back through the pump into the filtrate compartment. This arrangement is generally unsatisfactory, since the clean liquid running back into the filtrate compartment at a substantial velocity can lift or tear the paper, releasing dirt into the tank by lifting it from the filter medium. Further, if the vacuum of the filtrate compartment is broken quickly, as by shutting off the pump, the levels of liquid standing in the dirty tank and the elevated clean tank tend to equalize, again pushing liquid upwardly through the filter medium to lift or tear the paper and to force dirt from the paper medium back into the tank. Similar problems are encountered where the filter medium is a loose fibrous filter aid deposited on the foraminous surface of the filtrate compartment. It is necessary to break the vacuum in order to convey the filter aid from the filtrate compartment surface, yet breaking the vacuum too quickly will cause the filter aid to float upwardly into the dirty liquid, while releasing the dirt accreted therein.

Other solutions include interposing a simple swinging check valve between the pump and the filtrate compartment, as in U.S. Pat. No. 4,571,302. The check valve is provided with a small diameter aperture so that some liquid from the clean tank can run back into the filtrate compartment. While this arrangement is satisfactory in some instances, it requires a multiplicity of valves, and the check valve is self-actuating by its own weight, and it is not a positive acting valve.

The present invention proposes a novel valve arrangement which is power-actuated to perform a multiplicity of functions. In a normal filter operating mode, the valve means is positioned in a first position at which the pump is directly connected to the filtrate compartment and flow from the clean liquid reservoir to the pump is prevented. When it is desired to move the filter medium, the valve is power-actuated to a second position at which the valve means accommodates reservoir-pump flow so the pump continues to supply clean liquid to the system, and the valve also permits limited reservoir-filtrate compartment flow to break the filtrate compartment vacuum.

More specifically, the pump communicates with the filtrate compartment by means of a duct which traverses the clean tank, and a single valve having two valving elements is interposed in the duct. A first element controls the flow of clean liquid into the duct, and this element is closed during normal filter operation and is opened during media renewal to supply clean liquid to the pump for circulation to the machining stations. A second valving element is interposed between the filtrate compartment and the duct, and this element is positioned to accommodate full filtrate flow to the pump during normal filtering operation, but is moved to restrict flow of clean liquid from the duct into the filtrate compartment during filter medium renewal, thus breaking the vacuum over a brief time span. The two valving elements are actuated in unison by a single power means, thus providing positive valving action during operation.

BRIEF DESCRIPTION OF THE DRAWINGS

FIG. 1 is a side elevational view, with parts broken away in a section, of a filter of the present invention.

FIG. 2 is a plan view, with parts broken away, of the filter of FIG. 1.

FIG. 3 is an enlarged side elevational view of the valve of the present invention as it is actuated for normal filtration operation.

FIG. 4 is a view similar to FIG. 3 showing the valve in an actuated position, as when the filter medium is being renewed.

FIG. 5 is a reduced sectional view taken along the plane 5—5 of FIG. 3.

FIG. 6 is a perspective elevational view, with parts broken away, of the filter of FIG. 1.

DETAILED DESCRIPTION OF THE INVENTION

As best shown in FIGS. 1, 2 and 6, the filter of the present invention is indicated by reference numeral 10 which comprises a tank 11 including a bottom wall 12, side walls 13 and an end wall 14, both projecting upwardly from the bottom wall 12. The fourth side wall of the tank is an upwardly and outwardly sloping ramp wall 15. The tank is subdivided by a transverse interior wall 16 extending vertically between the side walls 13 and the bottom wall 12 and a longitudinal, vertical wall 17 to define side-by-side pump and clean liquid chambers 18 and 19, respectively. The clean water tank or compartment 19 thus is defined by the end wall 14, the transverse wall 16, the longitudinal walls 13 and 17, and a bottom wall 20 parallel to the tank bottom wall 11. That portion of the transverse wall 16 located beneath the bottom wall 20 is open or apertured.

The tank 11 forward of the transverse wall 16 defines a dirty liquid compartment 22 and a perforate, horizontal, filter medium support wall 23 is disposed above the bottom wall 12 of the tank and the parallel thereto. The space beneath the support wall 23 defines a filtrate or clean liquid compartment 24 which communicates freely with the filtrate flow space 25 located beneath the bottom wall of the clean liquid tank 19. The pump compartment 18 is isolated from the filtrate compartment 24 by the vertical tank walls 16 and 17.

A roll 30 of filter medium, preferably paper, is provided above the tank 11, and the continuous medium 31 is trained about rollers 32 to pass vertically downwardly adjacent the wall 16 to lie horizontally above the perforate support 23 and to lie against the inclined ramp wall 15 for removal about a roll 33 into a receptacle, such as a tote box 34. A chain conveyor indicated generally at 37 and comprising transverse slats 38 secured at each end to link chains 39 is disposed within a closed loop, in which the linked chains are trained about sprockets 40-43 in a path which closely overlies the media sheet 31. Additional arcuate guides 44 are provided for the chains. The chain is driven by a drive sprocket driven by any suitable means, such as an electric motor 45, and connected to the sprocket 43 by a drive chain 46.

Contaminated liquid is introduced into the dirty liquid compartment 22 through an inlet pipe 48 in one of the side walls 13.

A transverse flow duct indicated generally by the reference numeral 50 and best seen in FIG. 6 is provided to bridge the compartments 18, 19 above the bottom wall 20 of the clean tank 19. This duct is rectangular in cross-sectional configuration, having a top wall 51 and side walls 52, and extends completely between the side walls 13 adjacent the rear wall 14 of the tank 11. The duct 50 is sealingly attached to the bottom wall 20 of the clean liquid compartment 19, and the duct 50 is open at its bottom in the compartment 18, the duct 50 discharging into the compartment 18 to provide clean liquid to the pump compartment.

Fluid flow to the duct 50 is controlled by a valve assembly 60 best illustrated in FIGS. 3 through 5 of the drawings. More specifically, the valve assembly 60 is disposed in vertically aligned apertures 53, 54 in the duct top wall 51 and the clean tank bottom wall 20, respectively. Positioned in the aligned apertures 53, 54 is a vertically disposed, generally cylindrical valve body 55 having apertures 56 located beneath the wall 20 and upper apertures 57 located above the wall 20. That portion of the valve body 55 aligned with the wall 20 is not apertured and is designated by the reference numeral 58.

Fluid flow through the valve body 55 is controlled by the valve assembly indicated generally at 60, this valve assembly comprising a vertical actuating rod 61 having a flat valve disk 62 retained adjacent the lower end of the rod 61 by suitable means, such as the nuts 63 threaded onto the peripheral threads of the rod 61. The rod 61 also carries an upper, flat poppet valve 64 positioned above the valve body 55 and in flatwise contact with a sealing plate 65. The poppet valve 64 and the sealing plate 65 are secured to the rod 61 in any suitable manner, as by nuts 66.

It will be noted from FIGS. 3 through 5 that the valve plate 62 is of a diameter somewhat less than the internal diameter of the valve body 55, while the valve body 64 and the seal plate 65 are of a diameter substantially greater than the exterior diameter of the valve body 55.

The valve assembly 60 is actuated between its lowered position of FIG. 3 and its raised position of FIG. 5 by suitable means, as by a fluid actuated motor 68 (FIG. 1). When the valve assembly 60 is in its lowered position of FIG. 3, the poppet valve 64 and the seal plate 65 contact the open upper end of the valve body 55 and prevent any flow of liquid from the clean tank 19 into the duct 50, and also valve elements 64, 65 prevent any flow from the space 25 into the clean tank 19. However, flow from the space 25 into the pump chamber 18 is provided, with the clean liquid from the filtrate compartment 24 flowing beneath the transverse wall 16 into the space 25, through the lower apertures 56 of the valve body 55 into the valve body, from the valve body outwardly into the duct 50 through the upper apertures 57 and through the duct for discharge through the open end thereof into the pump chamber 18.

When the actuating motor 68 is actuated to elevate the actuating rod 61, the valve assembly 60 is moved to its position of FIG. 4. As shown in FIG. 4, the valve elements 64, 65 are spaced from the open upper end of the valve body 55 and flow from the clean tank 19 into the duct is accommodated, this liquid flowing through the open top of the valve body 55 into the valve body, outwardly through the apertures 57 into the duct 50 and out the open bottom of the duct 50 into the pump compartment 18. At the same time, the lower valve plate 62 is positioned in the unapertured section 58 of the valve body 55, thus shutting off most of the liquid flow from the valve body beneath the plate and outwardly through the apertures 56 into the space 25. However, some leakage of liquid past the valve plate 62 will be accommodated, and this liquid flows between the periphery of the plate 62 and the internal diameter of the valve body 55 to exit through the apertures 56 into the space 25.

As best shown in FIGS. 1 and 2, the pump 70 is positioned in the pump compartment 18, this pump being driven by a motor 71 and discharging through a pipe 72 to circulate clean liquid from the compartment 18 to the various machining stations. A bypass line 73 is provided to bypass a minor portion of the flow through the line 72 into the clean liquid tank 19. Any excess liquid bypassed to the tank 19 spills over the wall 16 into the dirty liquid tank 22.

In operation, the pump 70 driven by the motor 71 evacuates the vacuum chamber 24 beneath the paper media 31, the pump 70 being connected to the chamber 24 through the duct 50 and the valve 60. When it is desired to replace the clogged filter medium 31 overlying the vacuum box 24, the change in pressure in the box 24 is reflected in a pressure switch (not shown) in the control box 75, and the control mechanism actuates the actuator motor 68 to elevate the valve 60 from its position of FIG. 3 to its position of FIG. 4.

The upward movement of the poppet valve 64, 65 accommodates the flow of clean liquid to the pump 70, so that the pump no longer draws liquid from the vacuum chamber 24, and the valve plate 62 is positioned at the non-apertured mid-portion 58 of the valve body 55, effectively blocking most of the flow of fluid from the clean tank 19 into the space 25 beneath the duct 50, but accommodating a limited flow of liquid past the valve plate 62. This flow of liquid is sufficient to break the vacuum in the box 24 over a period of time, on the order of 5 to 30 seconds.

This breaking of the vacuum in the box 24 will accommodate movement of the paper medium 31 when the conveyor 37 is moved by actuation of the motor 45 by an appropriate control in the box 75. The motor 45 continues to operate and the conveyor 37 is moved sufficiently to position a new or unused reach of filter medium 31 over the vacuum box 24, at which time the conveyor is stopped, and the valve motor 68 is actuated to lower the valve 60 from its position of FIG. 4 to its position of FIG. 3, and normal operation is resumed.

I claim:

1. A filtration apparatus comprising a tank of contaminated liquid overlying a lower perforate support wall, a vacuum chamber underlying the perforate support wall, a filter medium overlying the perforate support wall, means for advancing the filter medium over the perforate support wall when the medium is clogged with contaminants, a pump located in a pump well remote from the vacuum chamber, a clean liquid tank interposed between the pump well and the vacuum chamber, a clean liquid duct extending from the vacuum chamber to the pump well and traversing said clean liquid tank, valve means in said duct moveable between a closed position to prevent communication between said clean liquid tank and said duct for normal operation and openable to a second position to acommodate such communication, power means for opening and closing said valve, and means moveable with said valve and interposed between the duct and the vacuum chamber to accommodate a restricted flow of clean liquid into the vacuum chamber when said valve is opened, so that the pump can operate continuously and the filter medium can be advanced when said valve is opened.

2. An apparatus as defined in claim 1, wherein the filter medium is a paper web advanced by a chain conveyor to renew the medium.

3. A filtration apparatus in which contaminated liquid is filtered, said apparatus comprising a paper filter medium overlying a vacuum box, a clean liquid pump having an intake communicating with said vacuum box, and a chain conveyor for advancing the paper filter medium when the paper filter medium is clogged with contaminants, and, to accommodate continuous pump operation and joint paper-conveyor movement, means for storing a body of clean liquid adjacent to the vacuum box, a duct traversing the body of clean liquid and normally connecting the pump to the vacuum box, valve means comprising two valving elements interposed in the duct between the vacuum box and the body of clean liquid, said valve means having two positions and moveable between (a) a normal operating position to accommodate clean liquid to the pump intake only from the vacuum box, and (b) an open position to accommodate primary liquid flow from the body of clean liquid to the pump intake and only restricted liquid flow from the body of clean liquid to the vacuum box, and power means for actuating said valve means between its closed and open position.

4. A filtration apparatus comprising a tank of contaminated liquid overlying a lower suction box, a filter medium interposed between the tank and the suction box, a clean liquid tank, a pump, a valve body interposed between the suction box and the pump, said valve body having a first means defining an opening through which liquid can flow from the suction box to the pump and a second means defining an opening through which liquid can flow from the clean liquid tank to the pump, a valve assembly movable between (a) a first normal operating position accommodating flow through the said first opening means only, and (b) a second position accommodating full flow through the second opening means while accommodating only restricted flow through the first opening means, and power means for moving the valve assembly between its first and second positions.

* * * * *